US011667089B2

(12) United States Patent
Bouchy et al.

(10) Patent No.: US 11,667,089 B2
(45) Date of Patent: Jun. 6, 2023

(54) PRODUCTION IN COMPOSITE MATERIAL OF A LOBED STRUCTURE OF A FLOW MIXER

(71) Applicant: SAFRAN CERAMICS, Le Haillan (FR)

(72) Inventors: Gaël Bouchy, Moissy-Cramayel (FR); Eric Philippe, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 254 days.

(21) Appl. No.: 16/753,641

(22) PCT Filed: Sep. 28, 2018

(86) PCT No.: PCT/FR2018/052395
§ 371 (c)(1),
(2) Date: Apr. 3, 2020

(87) PCT Pub. No.: WO2019/068996
PCT Pub. Date: Apr. 11, 2019

(65) Prior Publication Data
US 2020/0254698 A1 Aug. 13, 2020

(30) Foreign Application Priority Data
Oct. 3, 2017 (FR) .................................. 1759244

(51) Int. Cl.
*B29C 70/46* (2006.01)
*B29C 69/02* (2006.01)
(Continued)

(52) U.S. Cl.
CPC ............ *B29C 69/02* (2013.01); *B29C 70/205* (2013.01); *B29C 70/462* (2013.01); *F02K 1/48* (2013.01);
(Continued)

(58) Field of Classification Search
CPC ............ B29C 33/485; B29C 2043/425; B29C 2043/5023; B29C 57/04; B29C 70/462; B29C 70/446
See application file for complete search history.

(56) References Cited

U.S. PATENT DOCUMENTS 3,248,756 A * 5/1966 Mills ...................... B29C 57/04
72/393
3,793,865 A * 2/1974 Krabacher .............. B29C 53/06
72/379.6
(Continued)

FOREIGN PATENT DOCUMENTS

DE 10 2011 077287 A1 12/2012
EP 2118474 11/2009
(Continued)

OTHER PUBLICATIONS

English translation of DE102016222583, Rolls Royce Deutschland, Ltd and Co. KG, (Published 2018, filed 2016). (Year: 2018).*
(Continued)

*Primary Examiner* — Matthew J Daniels
(74) *Attorney, Agent, or Firm* — Cozen O'Connor

(57) ABSTRACT

The invention relates to the production of a composite material of a lobed structure (10) of a flow mixer which comprises a portion having a plurality of lobes (17, 19). For this purpose, a fibrous preform containing a resin will be produced in a simple geometric configuration of developable revolution. This is an intermediate state. By exploiting the thermoformable or thermosetting nature of the resin, the geometry of this intermediate preform is modified to deform it with limited offsets towards the final geometry.

11 Claims, 4 Drawing Sheets

(51) Int. Cl.
  *B29C 70/20* (2006.01)
  *F02K 1/48* (2006.01)
  *B29C 70/38* (2006.01)
  *B29K 101/10* (2006.01)
  *B29L 31/00* (2006.01)

(52) U.S. Cl.
  CPC ........ *B29C 70/382* (2013.01); *B29K 2101/10* (2013.01); *B29L 2031/7504* (2013.01); *F05D 2300/604* (2013.01)

(56) References Cited

U.S. PATENT DOCUMENTS

| | | | | |
|---|---|---|---|---|
| 3,861,140 | A * | 1/1975 | Krabacher | F02K 1/386 72/379.6 |
| 4,481,698 | A * | 11/1984 | Salerno | B21D 53/16 29/889.22 |
| 4,967,599 | A | 11/1990 | Donguy | |
| 5,634,367 | A * | 6/1997 | Yamada | B30B 7/04 72/402 |
| 5,884,472 | A * | 3/1999 | Presz, Jr. | F02K 1/386 239/265.17 |
| 6,463,992 | B1 * | 10/2002 | Dowhan | F02K 1/48 164/46 |
| 9,616,484 | B2 * | 4/2017 | Gekht | B21D 51/10 |
| 10,947,927 | B2 * | 3/2021 | Todorovic | F02K 1/48 |
| 2008/0157437 | A1 * | 7/2008 | Nelson | B29C 70/38 264/405 |
| 2010/0005780 | A1 | 1/2010 | Coupe et al. | |
| 2012/0100321 | A1 | 4/2012 | Goering et al. | |
| 2014/0186166 | A1 * | 7/2014 | Kostka | F01D 5/143 415/182.1 |
| 2014/0260283 | A1 * | 9/2014 | Bouchard | F02K 1/48 60/770 |

FOREIGN PATENT DOCUMENTS

| | | |
|---|---|---|
| EP | 2949449 | 12/2015 |
| FR | 2 912 469 A1 | 8/2008 |
| FR | 3030505 A1 | 6/2016 |
| WO | WO96006958 | 3/1996 |
| WO | WO9706948 | 2/1997 |
| WO | WO 2012/046020 A1 | 4/2012 |
| WO | WO2014044963 | 3/2014 |
| WO | WO2014154981 | 10/2014 |
| WO | WO2016102839 | 6/2016 |
| WO | WO2017060601 | 4/2017 |

OTHER PUBLICATIONS

Shadmehri, F., X. Cai, M. Hojjati, J. Chen, S.V. Hoa, Effect of autoclave process on the quality of thermoplastic composite truncated cones manufactured using automated fiber placement technique, Sci. Eng. Compos. Mater. vol. 22, No. 2 (2015), pp. 175-186. (Year: 2015).*

International Patent Application No. PCT/FR2018/052395, International Search Report and Written Opinion dated Feb. 12, 2019, 17 pgs.

* cited by examiner

PRODUCTION IN COMPOSITE MATERIAL OF A LOBED STRUCTURE OF A FLOW MIXER

CROSS-REFERENCE TO RELATED APPLICATIONS

This application is a 35 U.S.C. § 371 filing of International Application No. PCT/FR2018/052395 filed Sep. 28, 2018, which claims the benefit of priority to French Patent Application No. 1759244 filed Oct. 3, 2017, each of which is incorporated herein by reference in its entirety.

The present invention relates to a process for manufacturing a composite material structure of a lobed structure of a gas turbine flow mixer in which said flow can flow from upstream to downstream.

Such a structure is frequently called a "mixer" and has the function of mixing two air streams from the aircraft engine concerned.

In the traditional and therefore known way, the final geometry of the lobed structure has a multilobed skirt, i.e. comprises a part forming such a skirt, having a plurality of lobes distributed around a longitudinal axis of the lobed structure.

Manufacturing a component with a shape as complex as a flow mixer lobed structure out of composite material is problematic. As of the part to be obtained has geometric singularities due to its shape, certain areas are inaccessible to the laying tool, such as the head of an AFP (automated fibre placement process) type laying robot intended for complex composites, produced from several layers of composite, or for a sewing head or needle implantation.

EP2118474, for example, shows a process for draping sectors which are then sewn together. FR2912469 also refers to such an achievement.

In order to provide at least part of the solution to the problem posed, the process of the invention proposes:
 a) producing a fibrous preform comprising one of a thermoformable resin and a thermosetting resin, in a configuration having an intermediate geometry essentially developable by post-forming to the final geometry of the part to be produced, the intermediate geometry being simpler than said final geometry,
 b) at least by exploiting the thermoformable or thermosetting nature of the resin, post-forming the intermediate geometric configuration of revolution, deforming it to the final geometry.

"Essentially expandable" by post-forming to the final geometry of the part means "at least partially" expandable by post-forming to the final geometry over more than 50% of the area of the intermediate geometric configuration. Thus, the intermediate geometric configuration may not be fully developable to the final geometry by post-forming.

Furthermore, in step a), if a thermosetting resin is used, it will a priori be in a pre-pushed state, as implemented in a prepreg, i.e. in a state of incomplete polymerisation, so that the resin-impregnated fibrous preform is deformable.

Also, a priori, the intermediate geometrical configuration will be of revolution. However, one could imagine applying the present manufacturing process on a plate that is easy to make (2D form) and to deform into more complex shapes (3D form).

Therefore, it is alternatively proposed that at least one step be provided for the generation of local offsets (local deformations of a fibrous texture when deformed into a new geometry) of the intermediate geometric configuration of the fibrous preform before or while post-forming.

An as least as possible number would be preferable.

In the case of a thermoformable resin used in step a), the resin will be favourably fugitive (i.e. capable of vaporizing at high temperature, typically a temperature below 900° C. and preferably a temperature of 300° C. to 400° C.) or soluble in a solvent (water or other), so that it disappears at least essentially—typically more than 80% and preferably more than 90%—before the end of the process.

In order to reconcile the requirements of industrial mass production at contained costs with the achievement of the required shape accuracy, it is also proposed that in step b), exploiting the thermoformable or thermosetting nature of the resin comprises heating the fibrous preform, and pressurising said fibrous preform, after it has been brought into contact with a mould with the final geometry of the part to be produced.

Furthermore, by providing that before the fibrous preform is put in contact with said mould to the final geometry of the part to be produced, said fibrous preform is produced on another mould, it will be possible to adapt the final shape more precisely, in a reproducible way in large series, without altering the full interest of the "first mould".

A relevant solution in connection with producing the fibrous preform also proposes that in step a), the preform produced:
 has an annular upstream portion that flares downstream, and/or
 has a flared shape, much like a sousaphone horn (typically more flared than a trumpet-like downstream end).

Thus, it will be possible to produce a developed part of the lobe shape of the mixer to be produced.

In fact, if there is no annular part before step b), the final part is easier to make. It can be based on a flat fibrous texture geometry that can be shaped with low offsets. With the above-mentioned upstream ring part, one must start from a preform with a more complex geometry to make and use.

For this reason, it is also proposed that the preform in step a) should be produced by an AFP process, which involves applying a preimpregnated tape or a tape coated with a binder using a robotic head to a mould with a relatively simple geometry.

Alternatively or in addition, in step (a), the fibrous preform will be produced from layers of yarns coated with a binder or pre-impregnated (i.e. a fibre+resin complex) belonging to a multi-layer texture or 2D fabric, and sewn or implanted with needles.

To carry out the successive geometrical configurations of steps a), then b), two successive moulds are preferably used, the first one—serving as a support for the "simple" intermediate geometry, for the AFP robot or the sewing or needle implantation head, for example—being non multilobed, or with significantly less marked multilobes than the second one, which will allow of the part to be moulded to the final desired geometry.

Since a mould will be used for step b), as mentioned above, and an intermediate flared configuration will have been chosen, it is further proposed:
 that the mould with the final geometry of the part to be produced is defined in such a way that it is multilobed, thus presenting, circumferentially, a succession of lobes, around an axis (X-X) which must correspond to the axis of the lobed structure, and
 that the intermediate geometrical configuration is defined so that, with said flare, said intermediate geometric configuration can be post-formed in contact with this multilobed mould.

In conjunction with the first aforementioned mould, used to obtain the intermediate geometric configuration, it will therefore be a mould with an annular upstream part which flares out towards the downstream, and/or having a flared shape, substantially like a sousaphone horn.

In this way, an appropriate compromise between a moulding process and intermediate and final geometric configurations will have been adopted.

In this context, if the intermediate geometrical configuration is indeed not fully developable to the final geometry by post-forming, it is proposed that, in this case, step b) includes a step of generating local offsets of said intermediate geometrical configuration of the fibrous preform before or while post-forming it.

If, on the other hand, as in the present case, a flow mixer structure is desired that best ensures good thermal conduction, thermal shock resistance, high stiffness, limited weight, good ductility and/or resistance to breakage, it is also proposed that the composite of the fibrous preform should include:

fibres containing alumina and an alumina matrix, or
fibres containing carbon or silicon carbide and a carbide matrix.

Thus, it will be possible to obtain a lobed structure in CMC—ceramic matrix composite—.

If necessary, the invention may be better understood and other details, natureistics and advantages of the invention will appear on reading the following description given by way of non-limiting example and with reference to the accompanying drawings.

DETAILED DESCRIPTION

Figure 1:
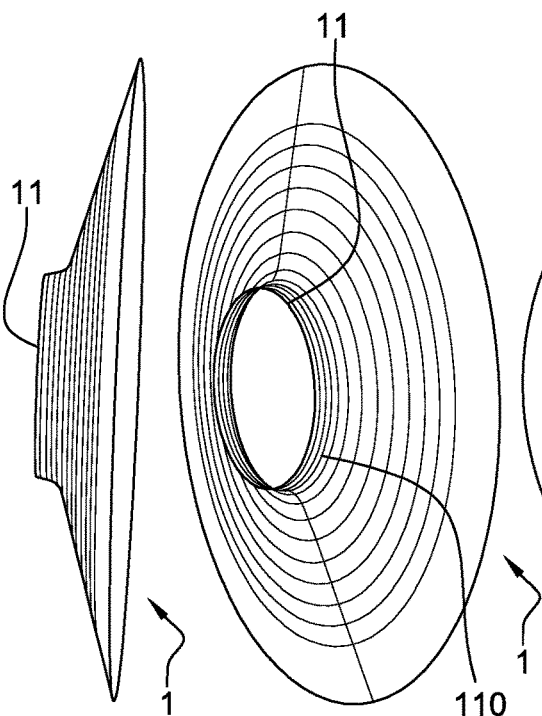
FIGS. 1 to 3 show a preform according to the invention with a substantially sousaphone horn shape, therefore without lobe.

As noted, one problem here is to produce a complex shaped part, in composite, preferably CMC. Also preferably, the fibres of the fibrous preform will be deposited by the AFP process. But the invention can also be applied to composite materials produced from 2D or multilayer textures, in a single piece by three-dimensional (3D) weaving, it being specified that, since of the part to be obtained has geometric singularities, certain areas are inaccessible for the head of an AFP robot, or a sewing head or a needle implantation head, thus manufacturing it difficult, if not impossible, to use one of these processes directly to obtain the desired geometry.

"Two-dimensional weaving" or "2D" means here a classical weaving method by which each weft thread passes from one side to the other of threads of a single warp layer or vice versa.

The method according to the invention can be adapted to allow the introduction of a loaded slip into 2D fibrous textures having a thickness of at least 0.5 mm, preferably at least 1 mm.

With a solution developed from 2D textures, the fibrous structure can be obtained by stacking continuous fibre layers which can be in the form of unidirectional fibre layer(s), such as woven, braided, knitted, felt, tablecloths, in particular. The layers can be connected to each other, for example by sewing, by inserting threads or rigid elements or by needling. WO2008104692 refers to sewing or needle implantation and WO9706948 or WO96006958 refers to the implantation of needles also called pins.

"Three-dimensional weave" or "3D weave" or "multi-layer weave" means here a mode of weaving by which at least some of the weft threads bind warp threads over several layers of warp threads or vice versa according to a weave corresponding to a weaving weave which may be, for example, interlock, multi-weave or other.

"Weave or interlock" means here a 3D weaving weave in which each layer of weft threads binds several layers of warp threads with all the threads of the same weft column having the same movement in the plane of the weave.

In the case of a multi-layer or 2D texture, the stitching or implantation will be favourably performed with the aim of reinforcing the material in its thickness and thus limiting the sensitivity to delamination. In this case, the entire surface of the preform can be sewn or implanted with needles.

Sewing or needle placement can also be used to join layers of texture together. This will be the case in particular, when working with multi-layer textures.

If the AFP technique is applied, rolls or strips of wire coated with a binder—a priori organic—or pre-impregnated (therefore fibrous texture plus resin) will be conveyed to the robot head. The fibres will remain taut between the roll or belt and the robot head.

If it is based on thermoformable resin, the roll or strip will be heated once at the level of the robot head, allowing the resin to flow, thus modifying its physicochemical characteristics, and become low viscous. The roll or strip will thus acquire an adhesive property and adhere well to the final shaping mould provided for in step b) above. A compacting roller will then press the roll or web against the mould. This compaction will prevent the formation of interstices and porosity. Then the roll or strip will be cut to the contours of the mould by the robot head equipped with cutting tools. Baking and polymerization can then be done in the autoclave. This process appears as a robust form of draping.

The continuous fibres manufacturing up the fibre structure shall a priori be refractory fibres, i.e. ceramic fibres, e.g. silicon carbide (SiC), carbon fibres or fibres made of a refractory oxide, e.g. alumina ($Al_2O_3$). The fibres can also be glass or metal fibres. The composite material produced will then have a structural strength that will be depend directly on the interlacing of the fibres between them.

As an alternative to a thermoformable resin as mentioned above, a thermosetting resin can be used. Once impregnated in this way, the fibrous structure will be compacted into shape in order to be adjusted to the chosen intermediate shape or geometry, thus increasing the fibre content in the shape defined by the corresponding mould.

In any case, this intermediate geometry must be developable from the final geometry and therefore be able to be post-formed to the desired final geometry with a minimum of cropping.

The final geometry will also preferably be of revolution.

The geometry of the fibrous preform to be developed by post-forming can be obtained from a CAD software, via perimeter measurements at different axial positions of the part. A new geometry will thus be constructed in line with the rule of maximizing the radii.

Thus, and as shown in FIGS. 1-4:

a) the starting point will initially be a fibrous preform 1 comprising one of a thermoformable resin and a thermosetting resin, in an intermediate geometry of revolution (FIGS. 1-3) which can essentially be developed by post-forming towards the final geometry of the part 10 to be produced (FIG. 4), b) then, at least by exploiting the thermoformable or thermosetting nature of the resin, it will be sufficient to post-form intermediate geometry 1 to make it reach final geometry 10.

The intermediate geometry is simpler than the final geometry: this intermediate geometry is a priori of revolution (see above) and without lobes, or with lobes of small amplitudes and/or large radii, as shown below. In a simplified manner, the perimeter of a section of the preform—intermediate geometry—will be equal to the perimeter of a section of the final geometry.

Figures 2, 3:
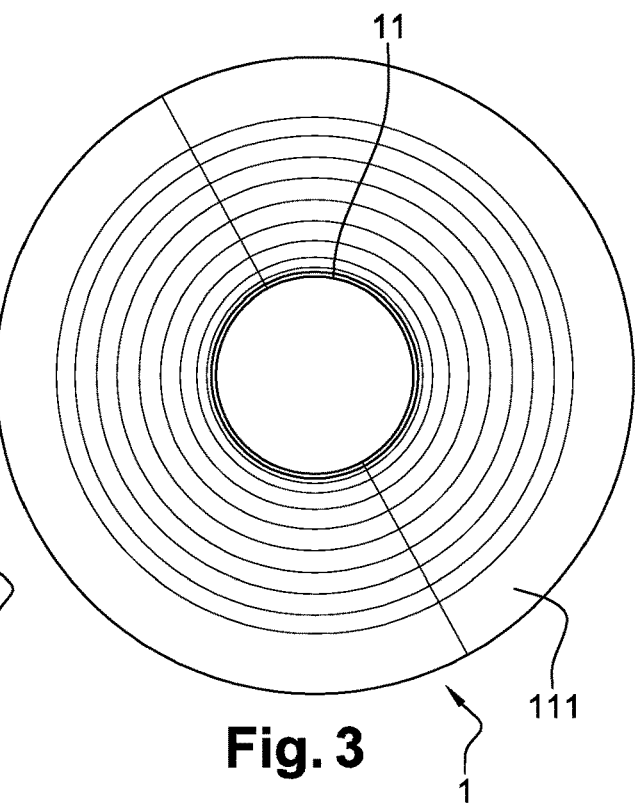

A priori, preform 1 will present an approximately sousaphone horn shape (as shown in FIGS. 1-3), therefore without lobe.

Figure 5:
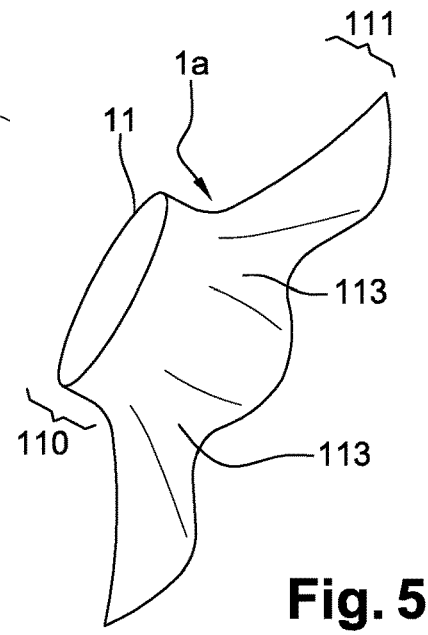
FIG. 5 is an alternative to FIG. 1.

However, according to the desired development between the upstream (AM) and downstream (AV) of the mixer 10 to be manufactured, the intermediate shape to be draped, marked 1a on FIG. 5, could present, as in the above hypothesis, an upstream end 11 of circular section, on a cylindrical base 110, extending towards the downstream (AV), generally like a sousaphone horn 111, but with lobes 113 having large radii in zone 111, manufacturing it compatible with the AFP, sewing or needle implantation processes. Typically, the radii will be greater than 150 mm and preferably 200 mm, even more preferably greater than 250 mm to allow the passage of an AFP robot head. For a sewing head, or a needle implantation head, the radii can be smaller: radii greater than 40 mm and preferably 45 mm, even more preferably greater than 50 mm. Elaborating such a preform 1a on a first mould 20, as shown below, will lead to the use of a mould with such large radii.

Among the advantages of choosing an AFP process is that it allows:

to freely specify the orientation of the drill bits,
to make a choice of drill bit orientations, thus facilitating texture deformation between the intermediate and final geometries,
to start and maintain a one-piece texture between a cylindrical upstream part 110 and a downstream part 111 with its lobes,
a continuity of material, without any material protrusion which is very detrimental to aerodynamics (air flow on the surface of the part),
no possible connections between various parts (110, 111 one-piece), no fixing connections, no overlap between layers.

Thus, the prospects for mass gain are interesting.

Figure 6:
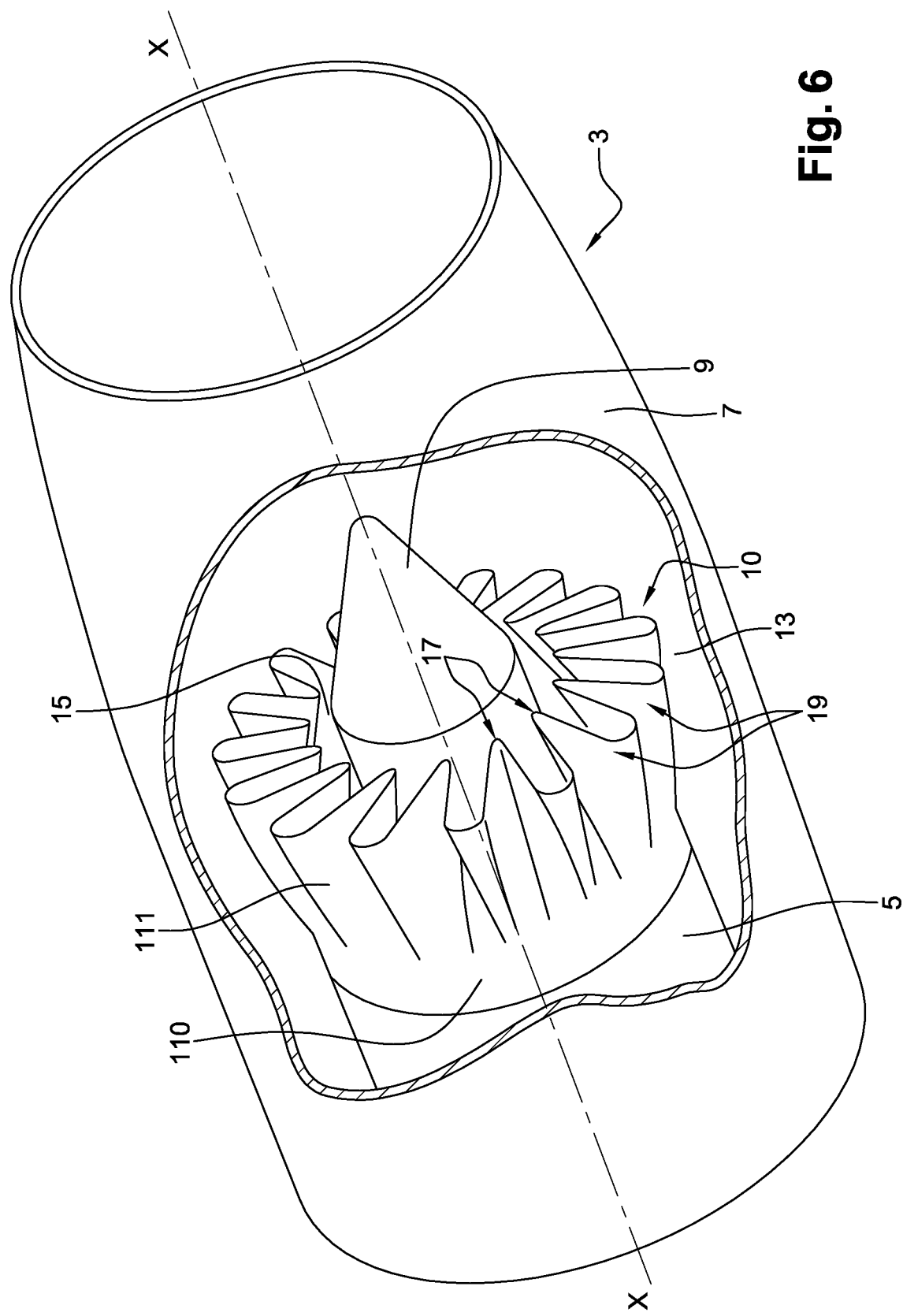
FIG. 6 shows a confluent flow exhaust diffuser of a double-flow aeronautical turbomachine equipped with the mixer of FIG. 4.

Concerning the mixer 10 to be manufactured, FIG. 6 schematically represents, in perspective and in skinned form, a confluent flow exhaust diffuser 3 of a double-flow aeronautical turbomachine.

Exhaust diffuser 3 is typically formed by a primary cowl 5, a secondary cowl 7 and a central body 9, all of which are centred on the longitudinal axis X-X of the exhaust diffuser.

Primary cover 5 extends along the longitudinal axis X-X. The central body 9 is arranged concentrically inside primary cover 5 and ends in a substantially conical section.

The secondary cover 7, here in a roughly cylindrical shape, surrounds the primary cover 5 and is concentric to it. Secondary cover 7 extends longitudinally downstream beyond primary cover 5.

In the example, the central body 9 is of the external type, i.e. the central body extends longitudinally beyond the trailing edge of primary cover 5. However, an internal type of confluent flow exhaust diffuser could also be involved.

The aforementioned concentric assembly makes it possible to define, on the one hand, between the primary cover 5 and the secondary cover 7, a first annular channel 13 for the flow of an external gaseous flow coming from the turbomachine and referred to as the secondary flow or cold flow, and, on the other hand, between the primary cover 5 and the central body 9, a second annular channel 15 for the flow of an internal gaseous flow coming from the turbomachine and referred to as the primary flow or hot flow.

The primary and secondary flows flowing in these two annular channels 13, 15 mix together at mixer 10 attached to the downstream end of primary cover 5.

Mixer 10 here is of the daisy type. It has a substantially cylindrical part 110 with axis of revolution X-X developing downstream and ending in a substantially circumferentially sinusoidal part 111, having radially inner lobes 17 and radially outer lobes 19.

The radially inner lobes 17 and outer lobes 19 are arranged alternately and evenly distributed around the entire circumference of mixer 10.

Figure 8:
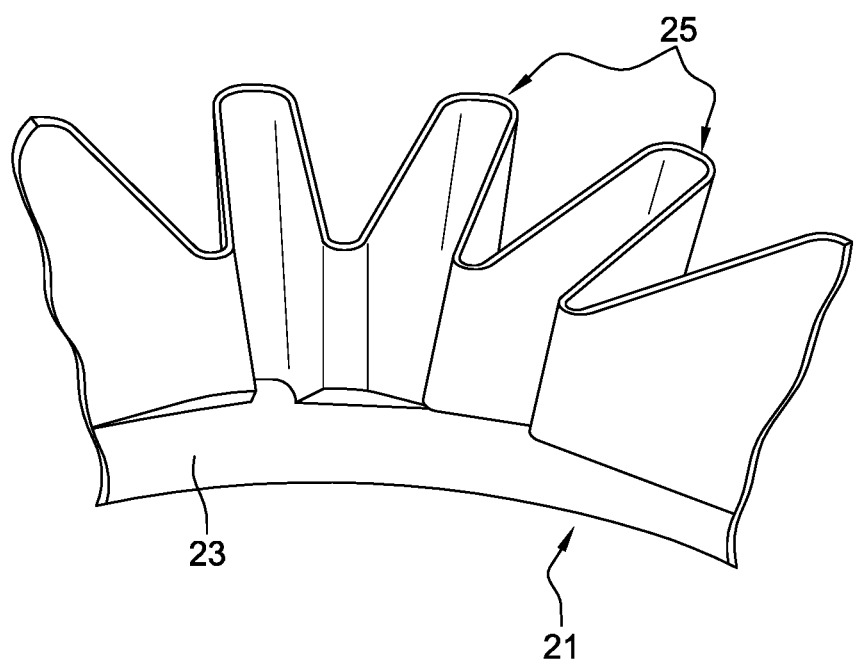
FIG. 8 shows a part of a second lobe mould to give the final shape to the preform: step b)

This being said, in order to manufacture such a mixer in series from composite material, at contained costs, with the achievement of the required precision of shape, it is preferable to exploit the thermoformable or thermosetting nature of the resin used, so that in step b) of post-forming:

the fibrous preform 1 (or 1a) is heated, and
this fibrous preform is pressurized, after it is brought into contact with a mould, such as 21, to the final geometry of part 10 (see FIG. 8).

Figure 7:
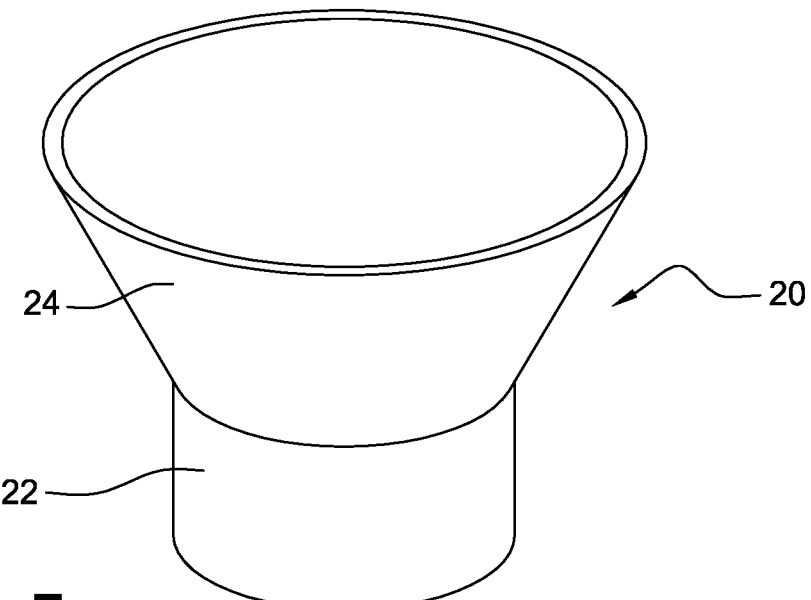
FIG. 7 shows a first simple mould that can be used to make the preform: step a)

In fact, if the fibrous reinforcing preform has an annular upstream portion which flares downstream by a portion to form a multilobed skirt, marked 1 or 1a, its component parts may have been assembled together and formed first on the first mould 20 of FIG. 7 and then finished on the second mould 21 of FIG. 8.

The first mould 20 will then present an annular upstream part 22 flaring downstream, in this case presenting a second part 24 substantially like a sousaphone pavilion.

The second mould 21 will have a shape corresponding to that of the lobed structure 10 to be manufactured, comprising therefore an annular part 23 corresponding to the annular part 110 of the final lobed structure (and a priori to the annular upstream part 22 of the first mould 20) and a multilobed part 25 corresponding to the multilobed skirt 111 (lobes 17 and 19 on FIG. 6).

If the shape in question could, for example, have been inscribed in a truncated cone, and thus, for example and in particular, could have been without a cylindrical ring part, resulting in a part without a ring part 110, it would, however, have been possible to start from a two-dimensional, flat, fibrous texture, which would simply have been shaped with small offsets.

Figure 9:
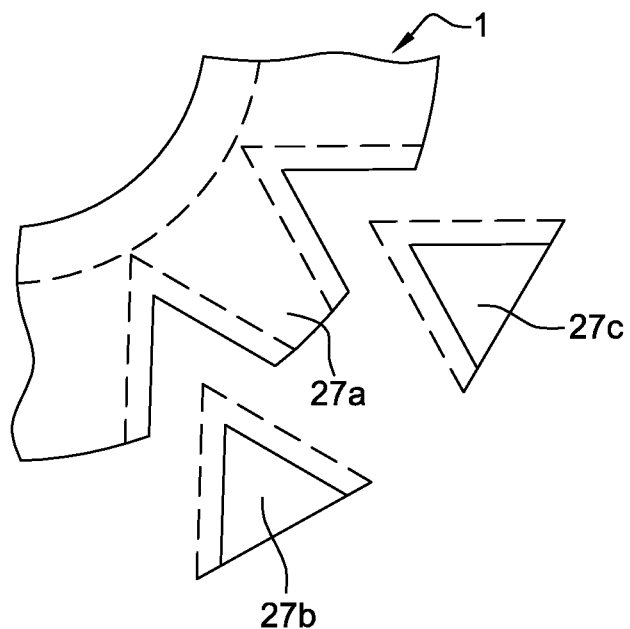
FIG. 9 shows a fibrous texture with elements to be sewn.
Figure 10:
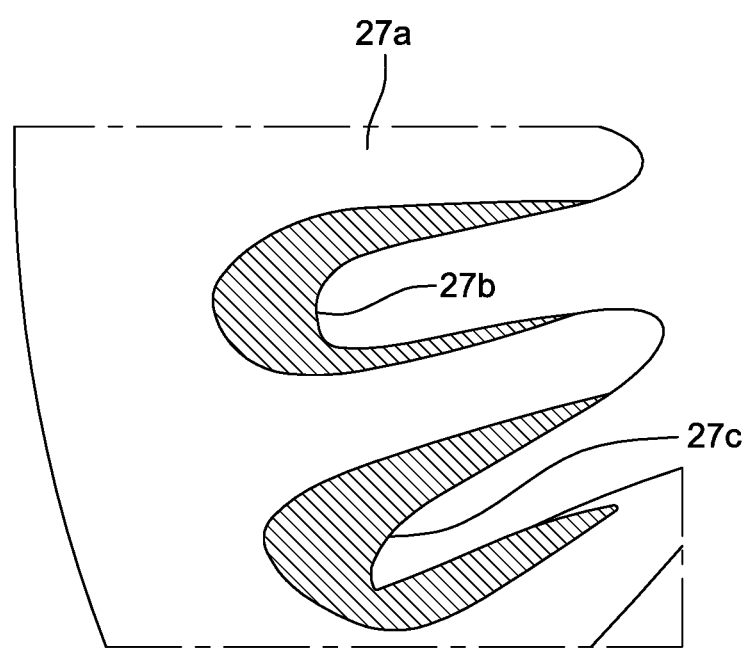
FIG. 10 shows the elements sewn on the mixer, in the final geometry, with the lobes of the mixer.

FIGS. 9 and 10 show an example of the sewing together of binder-coated or prepreg yarn layers, multilayer 27a, 27b, 27c used in the manufacture of mixer 10. On FIG. 9, these are the seams of these strata, produced on preform 1, according to the initial geometry. The dotted lines symbolize the seams. On FIG. 10, we find the sewn elements 27a, 27b, 27c on mixer 10, at the final geometry, with the lobes.

In the following, we will take the example of using thermoforming resin to make preform 1 or 1a.

Examples include: PVA, PEG, PVP, PMMA, . . . , and as thermosetting resin: phenolic, polysiloxane, . . . .

Firstly, this resin will favourably be either fugitive (i.e. capable of vaporizing at a temperature above 900° C. and preferably between 300° C. and 400° C.) or soluble in a solvent, so that it disappears at least essentially before the end of the process, thus avoiding a specific heat treatment.

If the preform is then obtained by AFP dry process (as mentioned in EP2949449), the fluidity and deformability of the resin (also called binder) will be favourably exploited so that the AFP laying robot automatically places the fibres so that the preform can first be plated on mould 20 and then finished with the expected shape of the mixer via the second mould 21: by heating the preform above the glass transition temperature of the resin (Tv, English; Tg for glass), representing the temperature range in which the material changes from a rubbery state to a glassy, solid (rigid) state, the preform will soften, allowing it to be deformed to the desired final geometry.

In fact, in order to arrive at the fibrous preform 1 or 1a in this intermediate geometrical configuration of revolution, the preform will have been favourably produced on a first tooling with a geometry having only large radii. Typically, it can be considered that to use an AFP robot head, radii greater than 150 mm and preferably 200 mm are required, even more preferably greater than 250 mm. For a sewing head, or a needle implantation head, the radii are smaller: radii greater than 40 mm and preferably 45 mm, even more preferably greater than 50 mm. With these constraints, mould 20 could have the shape shown in FIG. 5, to make the fibrous preform 1a.

Once the preform has been produced, it is transferred to the new tooling in the shape of the final geometry of the part to be manufactured, such as mould 21 in FIG. 8. During this shaping of the preform, its reheating, by hot air or heated mould 21 for example, will be followed by swaging operations which will ensure the softened preform is in intimate contact with the mould (with a counter-mould if necessary). The assembly is then returned to room temperature and the manufacturing cycle of the part can then continue. In the case of using a prepreg sewn or implanted with needles, a polymerisation of the resin will be carried out to fix the final geometry of the part.

Figure 4:
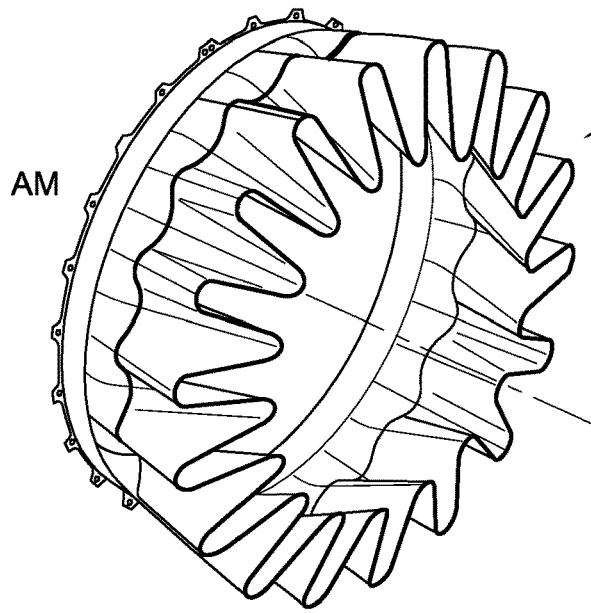
FIG. 4 shows a civil aircraft gas turbine flow mixer with a lobed structure.

Taking as an example of a part the one shown in FIGS. 1 to 3 and 4, a critical point lies in the mastery of the transformation of the preform, marked 1 in the example, from its intermediate state in FIGS. 1 to 3 to its final state in FIG. 4: stage of the final part plated on mould 21, to the final geometry.

Thus it is foreseen, as soon as said intermediate geometric configuration will indeed not be totally (or integrally) developable towards the final geometry by post-forming, as in the above example, that the above-mentioned step b) of post-forming potentially includes a step of generating local offsets of said intermediate geometric configuration of the fibrous preform, before post-forming it, or during post-forming.

In fact, there will be then, a digital generation—by computer—of local offsets, thus local deformations of the fibrous texture to bring it to a geometry allowing it to be applied totally (or entirely) on mould 21 in the example. In practice, it is often not (sufficiently) possible to deform orthogonal fibres in a so-called fibrous texture (to decompose them) beyond 45°. Cropping then consists in changing the angles between warp and weft initially from 90° to angles between 35° and 125°), which is typically obtained when a fabric is stretched in at least one direction not parallel to a direction of the fibres of said texture, as referred to in WO2014044963 or WO2014154981.

In fact, the cropping of geometrical profiles may therefore include deformations induced on a 2D geometrical profile shaping it to obtain a 3D geometrical profile.

However, it is preferable that these local offsets be as small as possible. Hence the importance of the technique for manufacturing the fibre structure and the choice of the starting preform (from FIGS. 1 to 3 in the example).

In this respect, it is also important to note the combined choice of the fibres and resin of the composite of the fibrous preform.

Thus, for good ductility and resistance to breakage during the manufacturing process, it is also proposed that this composite be of the CMC type, with fibres containing alumina and an alumina matrix, or carbon or silicon carbide and a carbide matrix.

The following is an example of the production of a preform obtained by AFP, using an initial fibrous texture with a thermoformable resin (or binder).

In this case, the thermoformable nature of the binder is exploited. To this end, its formulation and fibre content are optimised to give the fibres (or strands) a behaviour that ensures:

automatic draping of the wicks/preform (need for a compromise between flexibility/rigidity of the wicks to ensure draping), thermally assisted bonding (on the robot draping head) of the drill bits to each other to hold the preform in place so that it can be handled, thermoforming at a temperature below 200° C. and handling of the preform after thermoforming, a fugitive or solvent-soluble binder so as to make it "disappear" before injection of the matrix and not block intra-wire colonization of the powders (ideally, solubility in hot water; the pH of the desensitizing solution can be modulated to facilitate removal of the binder).

Examples of binder formulations:

|  | PVA (alcool Polyvinylique) (% m) | PVP (Pyrrolidone Polyvinylique) (% m) | PEG (Poly Ethylene glycol) (% m) | Hydro-soluble |
|---|---|---|---|---|
| Exemple 1 - liant | 70-99 |  | 1-30 | Oui |
| Exemple 2 - liant |  | 70-99 | 1-30 | Oui |
| Exemple 3 - liant |  |  | 100 | Oui |
| Exemple 4 - liant | Autres combinaisons de ces 3 élements | | | oOi |
| Exemple 5 - liant | Formulation à base de cire, dextrine de maïs . . . | | | |

Exemples da taux de liant:

|  | Liant - % m minimum - (rapporté à la masse totale du liant + mèches) | Liant - % m maximum- (rapporté à la masse totale du liant + mèches) |
|---|---|---|
| Exemple 1 | 5 | 40 |
| Exemple 2 | 15 | 35 |
| Exemple 3 - préférentiellement | 15 | 25 |

Prior to binder removal, the preform is placed in a tooling that holds the fibres between the binder removal and matrix densification steps. This tooling can be male or female and in this case the preform will be plated into the tooling by a vacuum bag. The tooling can also be male/female with an air gap equal to the thickness of the part to be produced. Densification by means of a matrix may include the steps of injecting a slurry made from ceramic fillers dispersed in a solvent, then drying and finally sintering. Such a process is described in FR3030505 A1, WO2016102839 or WO2017060601.

At the end of thermoforming step b), the preform is therefore placed in a tooling before removing the binder. In a judicious way, this tooling can also be used to inject all or part of the part's die and thus make it possible to fix the final geometry.

In other words, after being initially produced on the first mould 20, part 5 of the example will be deformed on the second mould 21 with lobes. Once this final shaping is done, one can either place a male mould or a tarpaulin over it, and carry out an operation to remove the resin or binder (typically either thermally or by hot water). Once this is done, the fibres will be "clean" but very (too) soft. Without demoulding, we will therefore move on to the slurry injection stage (low pressure liquid resin injection moulding, close to the RTM process, low pressure liquid resin injection moulding) or densification stage (typically in an oven).

In the case of a part made of oxide/oxide material, the preform can be made from oxide wires such as Nextel 610 ™ or Nextel 720 ™ for example. The matrix can be implemented by an injection/filtration process of a slip loaded with an oxide powder, such as alumina, silica or zirconia for example, or a mixture of oxide powders. Such an injection process is described in WO2017060601 and in WO2016102839.

Generally speaking, the matrix could therefore be a refractory oxide, but could be a ceramic and the binder could be PVA, PVP, PEG, . . . .

Now follows a 2D preform embodiment or multilayer textured prepreg sewn or implanted with needles:

The thermoformability of the prepreg resin is exploited. The formulation and the resin rate are optimized, in order to give an ideal behaviour to the strata, allowing to ensure at the same time:
draping of the strata (need for a compromise between flexibility/rigidity of the strata to ensure draping),
sewing or implanting needles to provide reinforcement in a direction orthogonal to the plane of the strata,
thermoforming at a temperature below 200° C. and handling of the preform after thermoforming.

Classically, phenolic resins can be used as a precursor of a carbon matrix. Polysiloxane, polysilazane or polycarbosilane resins may be used as a precursor to a carbide matrix.

After thermoforming the preform, the resin is polymerized and then pyrolyzed to convert the organic precursor into carbon or ceramic. The total densification of the part is then carried out by PIP (Pyrolysis and Polymer Impregnation), filler injection, CVI (gas densification) or a combination of these processes.

The invention claimed is:
1. A method for manufacturing a composite material structure for a lobed structure of a gas turbine flow mixer, said flow flowing from upstream to downstream, the lobed structure having a final geometry and comprising a multi-lobed skirt portion having a plurality of lobes distributed around a longitudinal axis of the lobed structure, the method comprising:
a) producing, by carrying it out on a first mold, a fibrous preform comprising one of a thermoformable resin and a thermosetting resin, in a configuration having a first geometry essentially developable by post-forming to the final geometry the composite material structure to be produced, and
b) transferring on a second mold the fibrous preform having the first geometry, and, at least by exploiting the thermoformable or thermosetting nature of the resin, post-forming the first geometry, on said second mold, by deforming it to the final geometry,
wherein the first mold has an annular upstream portion and a downstream portion which flares out from the upstream cylindrical base with no lobes to form the first geometry, the annular upstream portion having a circular section and/or a cylindrical shape, and,
wherein the second mold has an annular upstream portion corresponding to the annular upstream portion of the first mold and a downstream multilobed skirt portion corresponding to the final geometry.
2. The method according to claim 1, wherein a thermoformable resin being used in step a), the resin is fugitive or soluble in a solvent so that it disappears at least essentially before the end of step b).
3. The method according to claim 1, in which, in step b), exploiting the thermoformable or thermosetting nature of the resin comprises heating and pressurizing said fibrous preform having the first geometry, after it has been brought into contact with the second mold.
4. The method according to claim 3, wherein the first geometry not being fully developable to the final geometry by post-forming, step b) comprises a step of generating local offsets of said first geometry of the fibrous preform before or while post-forming said fibrous preform.
5. The method according to claim 1, in which, in step b), exploiting the thermoformable or thermosetting nature of the resin comprises heating and pressurizing said fibrous preform having the first geometry, after it has been brought into contact with the second mold.
6. The method according to claim 1, wherein the preform in step a) is produced by an AFP method.
7. The method according to claim 1, wherein in step a) the fibrous preform is produced from layers of binder-coated yarns or prepreg belonging to a multilayer texture or 2D fabric and is sewn or implanted with needles.
8. The method according to claim 1, comprises a step of generating local offsets of said first geometry of the fibrous preform before or while post-forming said fibrous preform.
9. A method for manufacturing a composite material structure for a lobed structure of a gas turbine flow mixer, said flow flowing from upstream to downstream, the lobed structure having a final geometry and comprising a multi- lobed skirt portion having a plurality of lobes distributed around a longitudinal axis of the lobed structure, the method comprising:
- a) producing, by carrying it out on a first mold, a fibrous preform comprising one of a thermoformable resin and a thermosetting resin, in a configuration having a first geometry essentially developable by post-forming to the final geometry the composite material structure to be produced, and
- b) transferring on a second mold the fibrous preform having the first geometry, and, at least by exploiting the thermoformable or thermosetting nature of the resin, post-forming the first geometry, on said second mold, by deforming it to the final geometry, wherein the first mold has an annular upstream portion and a downstream portion which flares out, with lobes of a first amplitude and a first radius to form the first geometry, the annular upstream portion having a circular section and/or a cylindrical shape, and, wherein the second mold has an annular upstream portion corresponding to the annular upstream portion of the first mold and a downstream multilobed skirt portion corresponding to the final geometry, so that the downstream portion of the first geometry will be deformed on the second mold to the final geometry, the lobes of the final geometry having individually a second radius, the second radius being shorter than the first radius.

10. The method according to claim 9, wherein the first radius is between approximately 150 and 250 millimeters.

11. The method according to claim 9, wherein the first radius is between approximately 40 and 50 millimeters.

* * * * *